United States Patent [19]

Takahashi

[11] Patent Number: 4,636,675
[45] Date of Patent: Jan. 13, 1987

[54] ROTOR SPIDER FOR ROTARY ELECTRIC MACHINE

[75] Inventor: Kengo Takahashi, Hitachi, Japan

[73] Assignee: Hitachi, Ltd., Tokyo, Japan

[21] Appl. No.: 698,817

[22] Filed: Feb. 6, 1985

[30] Foreign Application Priority Data

Feb. 7, 1984 [JP] Japan .................................. 59-21232

[51] Int. Cl.⁴ .............................................. H02K 1/30
[52] U.S. Cl. ...................................... 310/157; 310/91; 310/261
[58] Field of Search ................. 310/157, 91, 269, 261, 310/42

[56] References Cited

U.S. PATENT DOCUMENTS

| 2,994,793 | 8/1961 | Sills et al. | 310/61 |
| 3,470,404 | 9/1969 | Agerman | 310/157 |
| 4,283,648 | 8/1981 | Spirk | 310/269 |

FOREIGN PATENT DOCUMENTS

| 0045202 | 8/1973 | Japan | 310/157 |
| 0060606 | 5/1977 | Japan | 310/157 |
| 0486792 | 1/1969 | Switzerland | 310/157 |
| 0665365 | 5/1979 | U.S.S.R. | 310/157 |

Primary Examiner—R. Skudy
Attorney, Agent, or Firm—Antonelli, Terry & Wands

[57] ABSTRACT

A disk-shaped spider connects together a rotating shaft and a yoke. In order to decrease circumferential stresses in the spider disk, the spider is divided into an inner spider and an outer spider, a disk constituting the inner spider being constituted by an integral body.

And a disk constituting the outer spider being radially divided into a plurality of pieces which are integrally connected together by flanges, or being constituted by an integral body.

2 Claims, 11 Drawing Figures

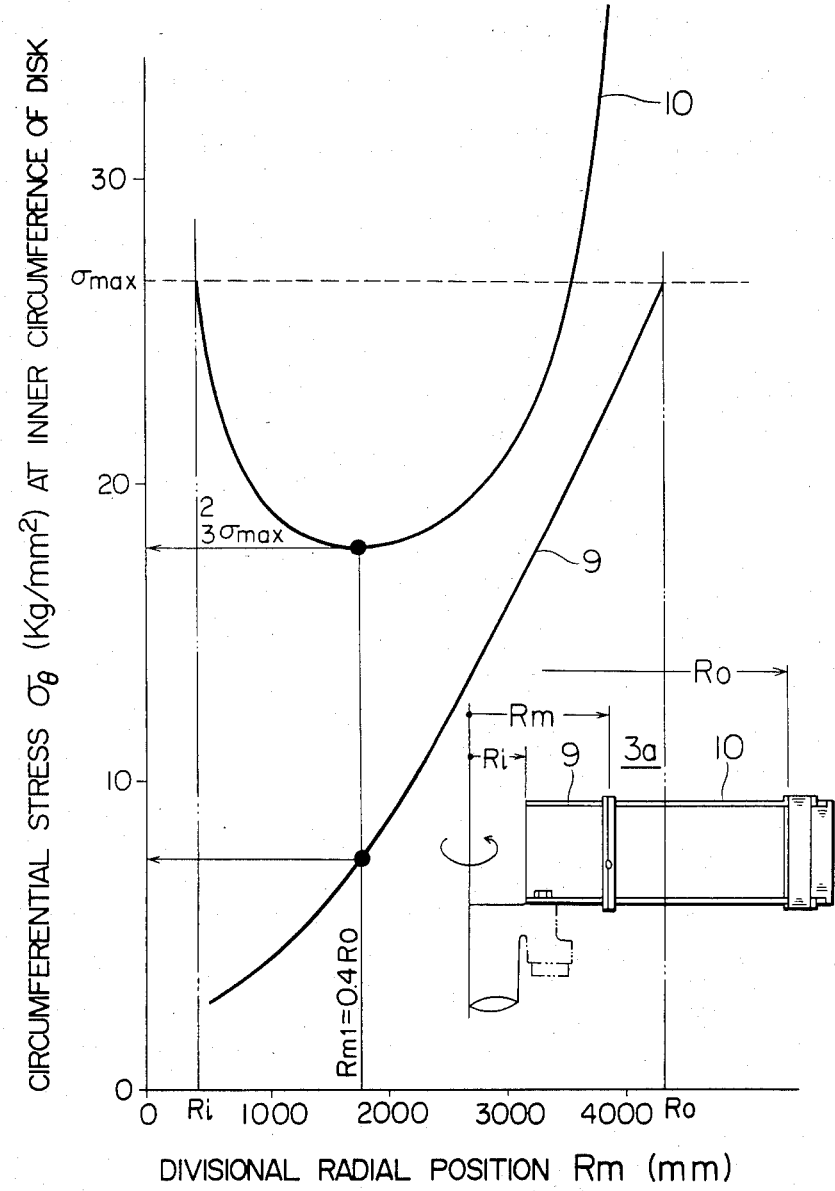

ROTOR SPIDER FOR ROTARY ELECTRIC MACHINE

FIELD OF THE INVENTION

The present invention relates to a rotor spider for a rotary electric machine.

It seems that there is no more room for development of large-sized hydroelectric power plants in Japan, owing to the limitations of its physical geography, which is to say that, in this country, it is not easy to find a suitable site for construction of such large-sized equipment. These days, therefore, the development of large-sized hydroelectric power plants is mostly limited to those which are made for export. It is necessary for large-sized hydroelectric power plant machinery to have a sectional structure which makes it possible for the machinery to be easily and safely transported whatever the conditions of transportation in the country to which it is to be exported. The need for such a sectional structure and the tendency to increase the size of hydroelectric power plant machinery have raised new problems in relation to the strength of apparatuses employed in the equipment. One of these problems is the strength of a rotor spider, which was the motivation for the present invention.

Referring first to FIGS. 1 to 3, there is shown an example of conventional rotor spiders for a rotary electric machine. As shown in FIG. 1, the rotor spider has an upper disk 3 and a lower disk 4 which in combination connect together a shaft 1 and a yoke 2. In the Figures: the reference numeral 5 denotes a flange; 6 a reinforcing member; 7 a web; and 8 a bolt. It is to be noted that known rotor spiders having the above-described arrangement include Japanese Utility Model Laid-Open No. 60,606/1977, Japanese Patnt Laid-Open No. 45,202/1975 and U.S. Pat. No. 2,994,793.

The arrangement of the conventional rotor spider will be further described hereinunder. Since both the upper and lower disks 3, 4 have the same structure, only the upper disk 3 will be explained hereinunder, being referred to as simply a "disk", and a description of the lower disk 4 is omitted in this specification of the present invention. As shown in FIG. 2, the disk 3 is divided into pieces along vertical planes each including the center of rotation such that the disk 3 has a sectional structure. However, this structure involves the following disadvantages in relation to the inner circumferential stress generated in the disk 3 and the strength of the inner circumferential portion of the disk 3 at the joint which is formed by means of the bolts 8, which could constitute obstacles to an increase in the size of the apparatus.

FIG. 2 also illustrates the distribution of hoop stresses in the disk 3 (circumferential stresses generated in the disk 3). Among the stresses distributed in the manner shown in FIG. 2, the inner circumferential stress $\delta_{\theta i}$ particularly gives rise to a problem. As shown in the Figure, the hoop stress distribution is not uniform: the hoop stress distribution curve rapidly rises as the stress measuring position on the disk 3 having a given dimension comes closer to the inner circumference thereof. On the other hand, FIG. 4 shows the change in the inner circumferential stress in the disk 3 measured when the outside radius thereof is increased while the inside radius is maintained at a constant value. In the graph of FIG. 4, with the inside radius and the outside radius denoted by $R_1$, $R_2$, respectively, the axis of abscissa represents the outside radius $R_2$, while the axis of ordinate represents the inner circumferential stress in the disk, thereby showing the relationship therebetween. As will be clear from the graph, the inner circumferential stress in the disk rapidly increases with an increase in the outside radius $R_2$. Thus, the inner circumferential stress in the disk represents a maximum stress value in the stresses generated in the disk and remarkably increases with an increase in the outside radius $R_2$ of the disk.

The above-described fact means that there is an upper limit in the outside radius $R_2$ of the disk with respect to a given allowable stress, that is, there is an upper limit to any increase in the size of the rotor spider. To suppress such increase in the inner circumferential stress in the disk, it is general practice to form the disk in such a manner that it has a non-uniform thickness as shown in FIG. 5: the thickness $T_i$ of the inner portion of the disk sectioned from the outer portion thereof at a sectional radial position $R_m$) is larger than the thickness $T_o$ of the outer portion of the disk which extends from the sectional radial position $R_m$ to a maximum radial position $R_o$. This disk structure, however, causes the weight of the apparatus to be increased, which fact gives rise to various problems in relation to the desired restriction of weight which stems from the problems encountered when the apparatus is transported and the limited capacity of the crane employed when the apparatus is assembled. The abovedescribed disk structure further increases the material costs, thus causing an increase in the product price, which results in a lowering in the competitive power of the product in the market.

On the other hand, the two-split flange joint of the disk suffers the following disadvantages in relation to the strength and structure thereof. Referring to FIGS. 6 and 7 which show the connecting bolts 8 within one pitch, if the thickness of the disk 3 is represented by $T_d$, the distance between the upper and lower bolts 8 by $l_m$, the bolt pitch by $l_p$, the thickness of one flange 5 by $T_F$, and the sectional area of the valley formed by the thread of each bolt 8 by $A_b$, then the stresses in relation to the flange 5 and the bolt 8 are roughly shown as follows.

$$\delta_B = (F/A_b)$$

tensile stress acting on the bolt $$F = l_p \times T_d \times \delta_{\theta i}$$

tensile stress acting on one-pitch portion of the disk $$\delta_F = (M_F/Z_F)$$

flexural stress acting on the flange $$M_F = [(F \times l_m)/4]$$

flexural moment in relation to the flange $$Z_F = [(l_p \times T_F^2)/6]$$

section modulus of the flange

In the above equations, the tensile stress F acting on one-pitch portion of the disk 3 can be regarded as substantially constant relative to the sectional area $A_b$ of the valley formed by the thread of the bolt 8 and the thickness $T_F$ of the flange 5. Accordingly, the stress in relation to the bolt can be affected only by the size of the bolt 8. To decrease the stress in relation to the bolt 8, therefore, it is only necessary to increase the bolt size. The stress in relation to the flange 5 is, however, inversely proportional to the square of the thickness of the flange 5. It is, therefore, necessary to increase the flange thickness in order to decrease the stress in relation to the flange 5. Any increase in the thickness of the flange 5 increases centrifugal force generated on the basis of the weight of the flange 5, resulting in a rise in the level of the stresses generated in the disk. In general, the reinforcing members 6 are interposed between the webs 7, as shown in FIG. 2, in order to reduce the weight of the disk and to increase the strength thereof. However, since the distance between the webs 7 is relatively small at the inner circumferential portion of the disk 3, incorporation of the reinforcing members 6 in the inner circumferential portion causes the structure thereof to be complicated and cramped, which may obstruct such an operation as tightening of the bolts 8. An increase in the outside radius of the disk 3 further intensifies such disadvantage. In an extreme case, it becomes impossible to conduct the bolt tightening operation or other necessary operations.

SUMMARY OF THE INVENTION

In view of the above-described facts, it is a primary object of the present invention to provide a rotor spider for a rotary electric machine which is able to decrease circumferential stresses in the disk.

To this end, according to the present invention, there is provided in a rotor spider for a rotary electric machine having an upper disk and a lower disk which in combination connect together a shaft and a yoke, an improvement comprising the upper and lower disks being each divided into an inner disk and an outer disk, the inner disk being constituted by an integral body, whereby each of the upper and lower disks may be radially split into two sections.

The above and other objects, features and advantages of the present invention will become clear from the following description of the preferred embodiment thereof, taken in conjunction with the accompanying drawings.

BRIEF DESCRIPTION OF THE DRAWINGS

FIG. 11 is a characteristic chart showing the relationship between the divisional radial postion and the circumferential stress in the outer circumferential portion of a disk in the embodiment of the rotor spirder for a rotary electric machine in accordance with the invention.

DESCRIPTION OF THE PREFERRED EMBODIMENT

Figure 8:
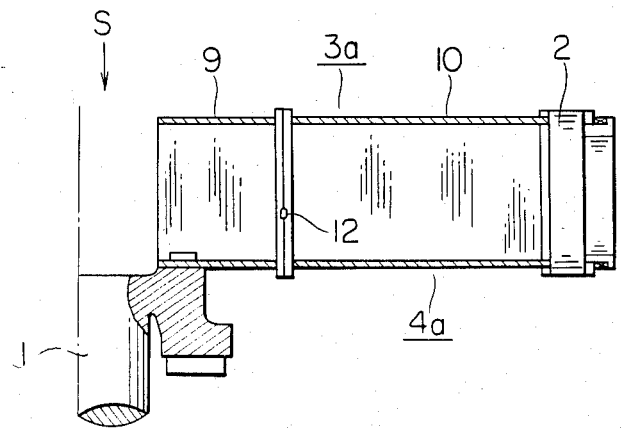
FIG. 8 is a vertical sectional view of one embodiment of a rotor spider for a rotary electric machine in accordance with the present invention.
Figure 10:
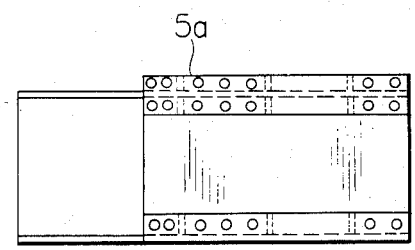
FIG. 10 is a sectional view taken along the line B—B of FIG. 9.
Figure 9:
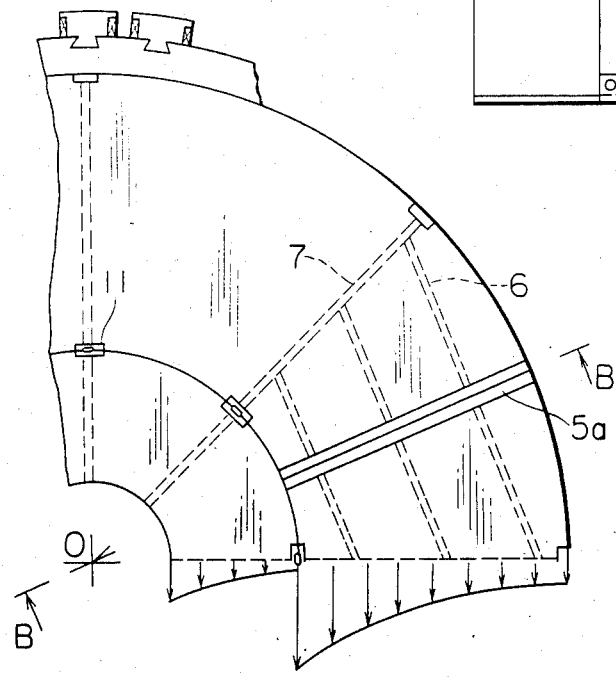
FIG. 9 is an illustration of the embodiment as viewed in the direction of the arrow S of FIG. 8.

The present invention will be described hereinunder through one embodiment with reference to the accompanying drawings. FIGS. 8 to 10 in combination show one embodiment of the present invention. It is to be noted that the same elements or members as those in the conventional rotor spider are denoted by the same reference numerals and the description thereof is omitted. According to this embodiment, a disk $3a$ is divided into an inner disk 9 and an outer disk 10 each of which is constituted by an integral body. It is to be noted that the reference numeral $5a$ in the figures denotes a flange. By virtue of this arrangement, the disk $3a$ may be radially split into two sections, whereby it is possible to obtain a rotor spider for a rotary electric machine which enables a decrease in the circumferential stresses in the disk $3a$.

Figure 1:
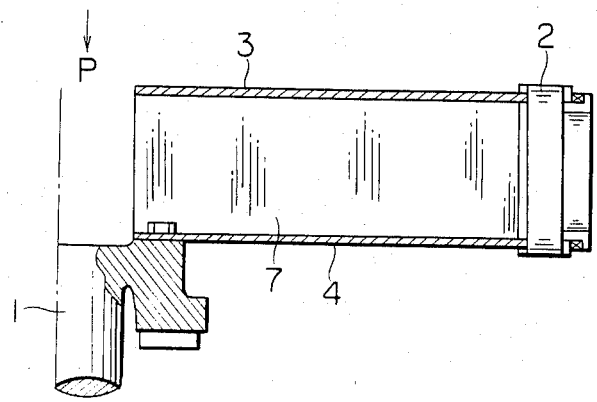
FIG. 1 is a vertical sectional view of a conventional rotor spider for a rotary electric machine.
Figure 2:
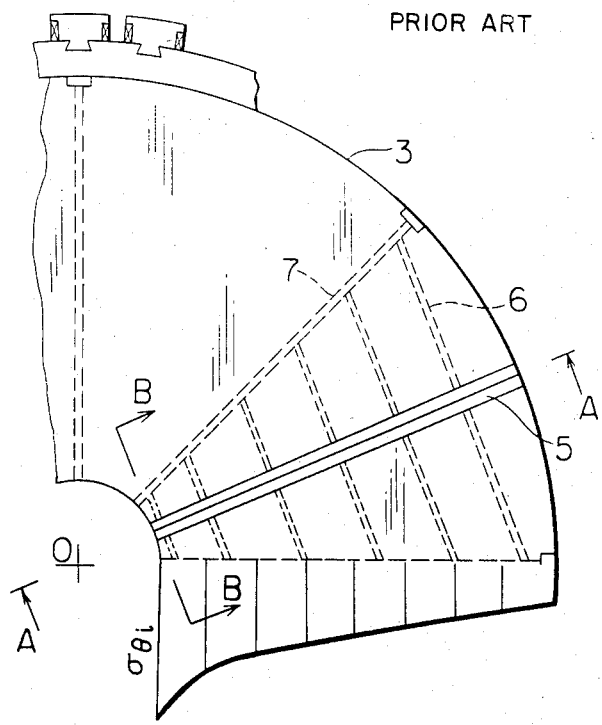
FIG. 2 is an illustration of the conventional rotor spider as viewed in the direction of the arrow P of FIG. 1.
Figure 3:
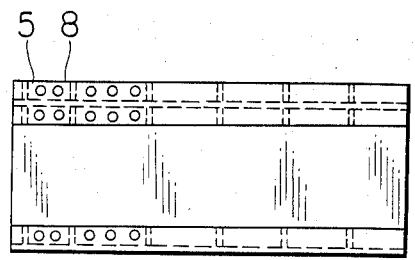
FIG. 3 is a sectional view taken along the line A—A of FIG. 2.
Figure 4:
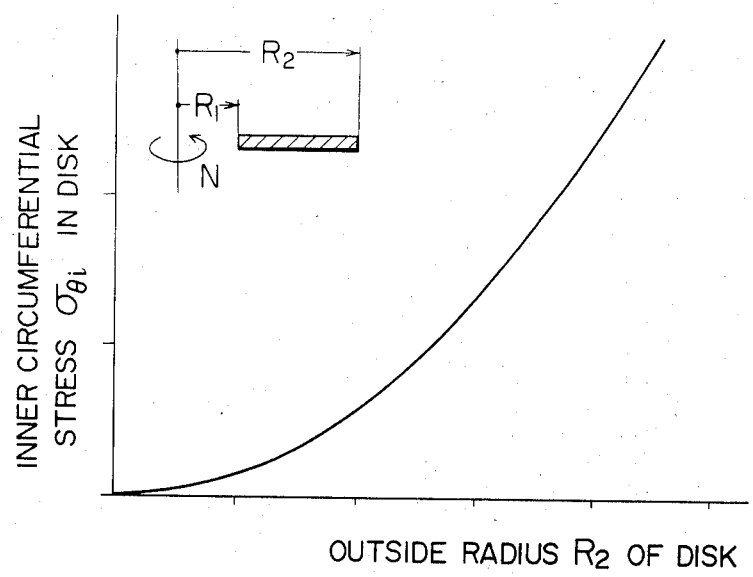
FIG. 4 is a characteristic chart showing the relationship between the outside radius of a disk constituting the conventional rotor spider for a rotary electric machine and the inner circumferential stress in the disk.
Figure 5:
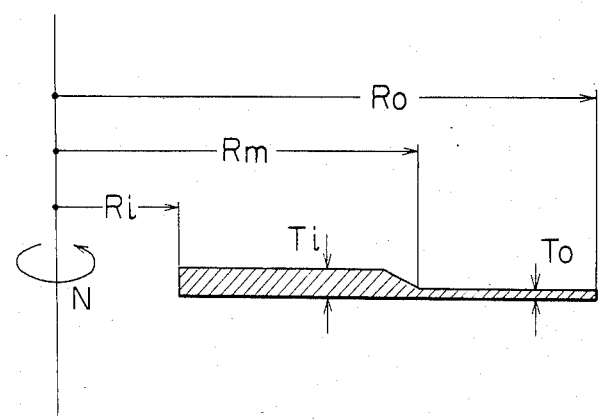
FIG. 5 is an illustration of a disk constituting a conventional rotor spider for a rotary electric machine, the disk having a non-uniform thickness in order to decrease stresses in the disk.
Figure 6:
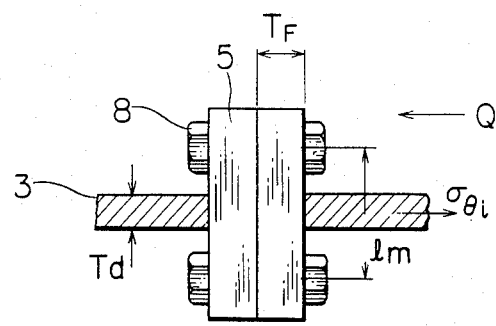
FIG. 6 is a sectional view taken along the line B—B of FIG. 2.
Figure 7:
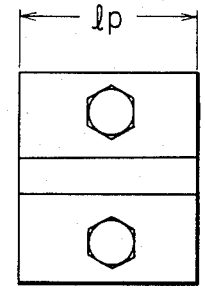
FIG. 7 is an illustration of a portion of the conventioinal spider rotor as viewed in the direction of the arrow Q of FIG. 6.

More specifically, the disk $3a$ is formed from the inner disk 9 and the outer disk 10 which are obtained by dividing a radially integral disk. The inner disk 9 and the outer disk 10 are connected together by torque keys 11 and weight supporting keys 12. The arrangement is such that torque is tansmitted through the torque keys 11, and weight is supported by the weight supporting keys 12. The inner disk 9 is constituted by a single integral body and, therefore, it is possible to eliminate the connecting flange structure which involves a disadvantage suffered by the conventional rotor spider. On the other hand, the outer disk 10 is radially divided into a plurality of pieces along vertical planes each including the center of rotation 0 in consideration of restrictions imposed on transportation, the number of pieces being selected according to need. The radially divided pieces are integrally connected together by flanges $5a$. By this arrangement, the level of circumferential stresses in the disk $3a$ is lowered as shown in FIGS. 9 and 11, in which: FIG. 9 illustrates how stresses are distributed in the disk $3a$; and FIG. 11 shows one example of the results of calculation of the level of stresses measured with respect to various radial positions at which the disk $3a$ is divided into the inner and outer disks 9, 10. As to FIG. 11, the disk shown in FIG. 1 is divided into the inner and outer disks 9, 10 at any desired radial position $R_m$, and changes in the circumferential stresses in the inner and outer disks 9, 10 in accordance with the divisional radial position $R_m$ are shown in the graph, in which: the axis of ordinate represents a maximum inner circumferential stress in the inner disk 9 (the circumferential stress at the radial position $R_i$ in FIG. 11) and a maximum inner circumferential stress in the outer disk 10 (the circumferential stress at the radial position $R_m$ in FIG. 11); and the axis of abscissa represents the divisional radial position $R_m$. The dotted line in FIG. 11 represents the stress generated in the disk $3a$ when the inner disk 9 has a radius $R_m = R_o$, or when the outer disk 10 has a radius $R_m = R_i$. In other words, the dotted line represents the level of stresses in the conventional disk shown in FIG. 1. As will be clear from FIG. 11, there is a minimum value in the stresses generated in the outer disk 10. Therefore, dividing the disk 3a at a position where the level of stresses in the outer disk 10 is lowest makes it possible to design the disk 3a in such a way that the stress is minimized. According to the example of the calculation shown in FIG. 11, an optimum divisional radial position is represented by $R_{m1}$, which means the optimum divisional radial position is located at a radial position corresponding to 40% of the maximum radius $R_o$. When the disk 3a is divided at the optimum divisional radial position $R_{m1}$, the stress level is lowered down to about ⅔ of that in the case of the conventional single integral disk. Although there are generally some variations among various products in terms of the optimum divisional radial position, it may be in the vicinity of the above-described position unless the structure of the disk drastically differs from that in this embodiment.

As has been described above, according to the present invention, the level of circumferential stresses in the disk (both the upper and lower disks) is lowered. Thus, it is possible to obtain a rotor spider for a rotory electric machine which is able to decrease circumferential stresses in the disk.

What is claimed is:

1. In a rotor spider for a rotary electric machine having an upper disk and a lower disk which in combination connect together a shaft and a yoke, an improvement comprising said upper and lower disks being each divided into an inner disk and an outer disk, said inner disk being constituted by an integral body, and said outer disk being radially divided into a plurality of pieces which are integrally connected together by flanges.

2. A rotor spider for a rotary electric machine according to claim 1, wherein said inner and outer disks are connected together by torque keys and weight supporting keys.

* * * * *